United States Patent [19]

Troukens et al.

[11] Patent Number: 4,539,481

[45] Date of Patent: Sep. 3, 1985

[54] METHOD FOR ADJUSTING A REFERENCE SIGNAL FOR A LASER DEVICE OPERATING IN A GIANT PULSE MODE

[75] Inventors: Theo Troukens; Antoon Mattelin, both of Oostkamp, Belgium

[73] Assignee: Siemens Aktiengesellschaft, Berlin & Munich, Fed. Rep. of Germany

[21] Appl. No.: 435,690

[22] Filed: Oct. 21, 1982

[30] Foreign Application Priority Data

Nov. 30, 1981 [DE] Fed. Rep. of Germany ....... 3147355

[51] Int. Cl.³ .............................................. G06K 15/00
[52] U.S. Cl. .................................... 250/557; 250/548; 356/400
[58] Field of Search .............. 364/559; 356/394, 392, 356/400; 250/227, 557, 231 R

[56] References Cited

U.S. PATENT DOCUMENTS

| | | | |
|---|---|---|---|
| 3,761,723 | 9/1973 | DeCock | 250/227 |
| 3,902,036 | 12/1975 | Zaleckas | 219/121 L |
| 4,163,157 | 7/1979 | Guignard et al. | 356/400 |
| 4,286,201 | 8/1981 | Roecks et al. | 356/400 |
| 4,360,274 | 11/1982 | Norton-Wayne | 356/394 |
| 4,379,308 | 4/1983 | Kosmowski et al. | 356/394 |
| 4,411,528 | 10/1983 | Newcomb et al. | 356/394 |
| 4,435,837 | 3/1984 | Abernathy | 356/394 |
| 4,449,084 | 5/1984 | Meno | 250/237 R |

Primary Examiner—David C. Nelms
Assistant Examiner—J. Jon Brophy
Attorney, Agent, or Firm—Hill, Van Santen, Steadman & Simpson

[57] ABSTRACT

A method and apparatus for adjusting the reference system of a pre-programmable laser device relative to the position of an inscription field of a part to be processed such as a silicon wafer characterized by a laser beam from a laser operating in a continuous wave mode being programmed to travel in various search motions with each motion traversing and passing over an edge of the part. The light which is unblocked by the part is received by a photoelectric element to trigger a position signal for each time the light passes across the edge of the wafer. The precise position of the wafer or part relative to the reference system is calculated from the position signals with the assistance of a computer and subsequently the coordinates of the reference system are corrected to match the precise position of the part.

8 Claims, 4 Drawing Figures

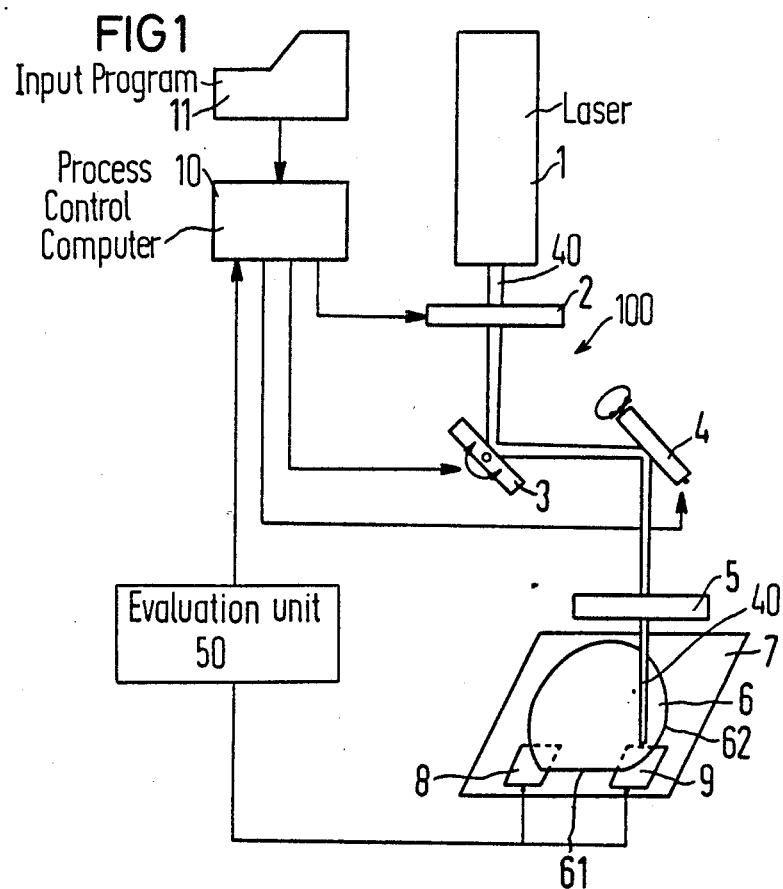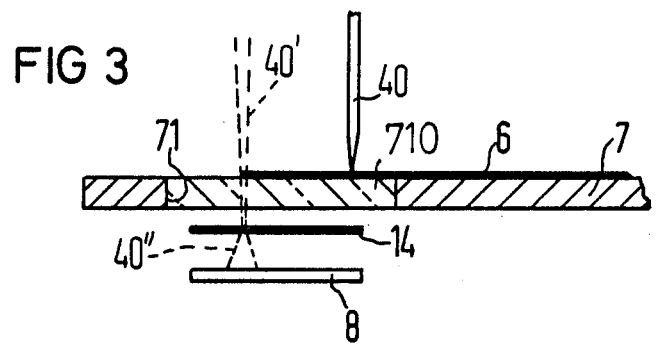

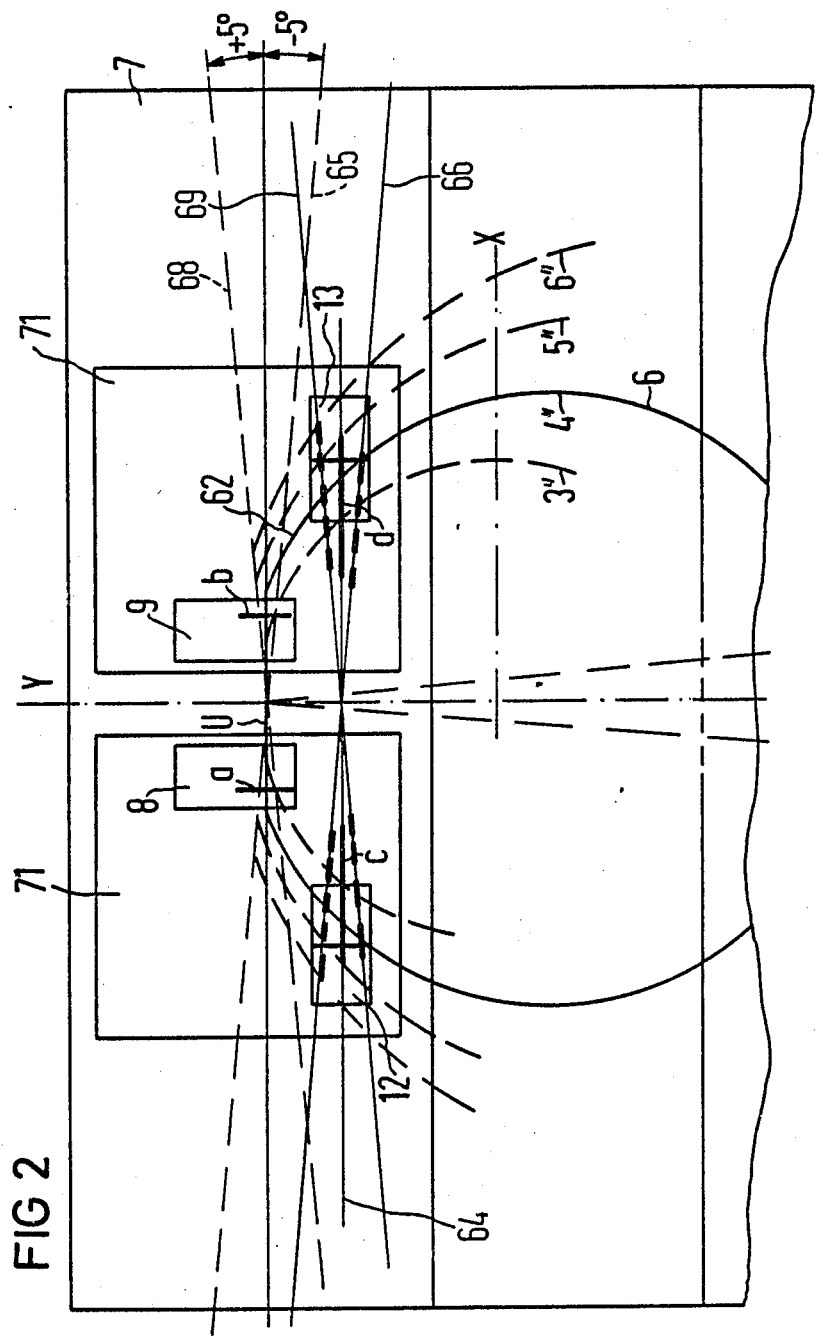

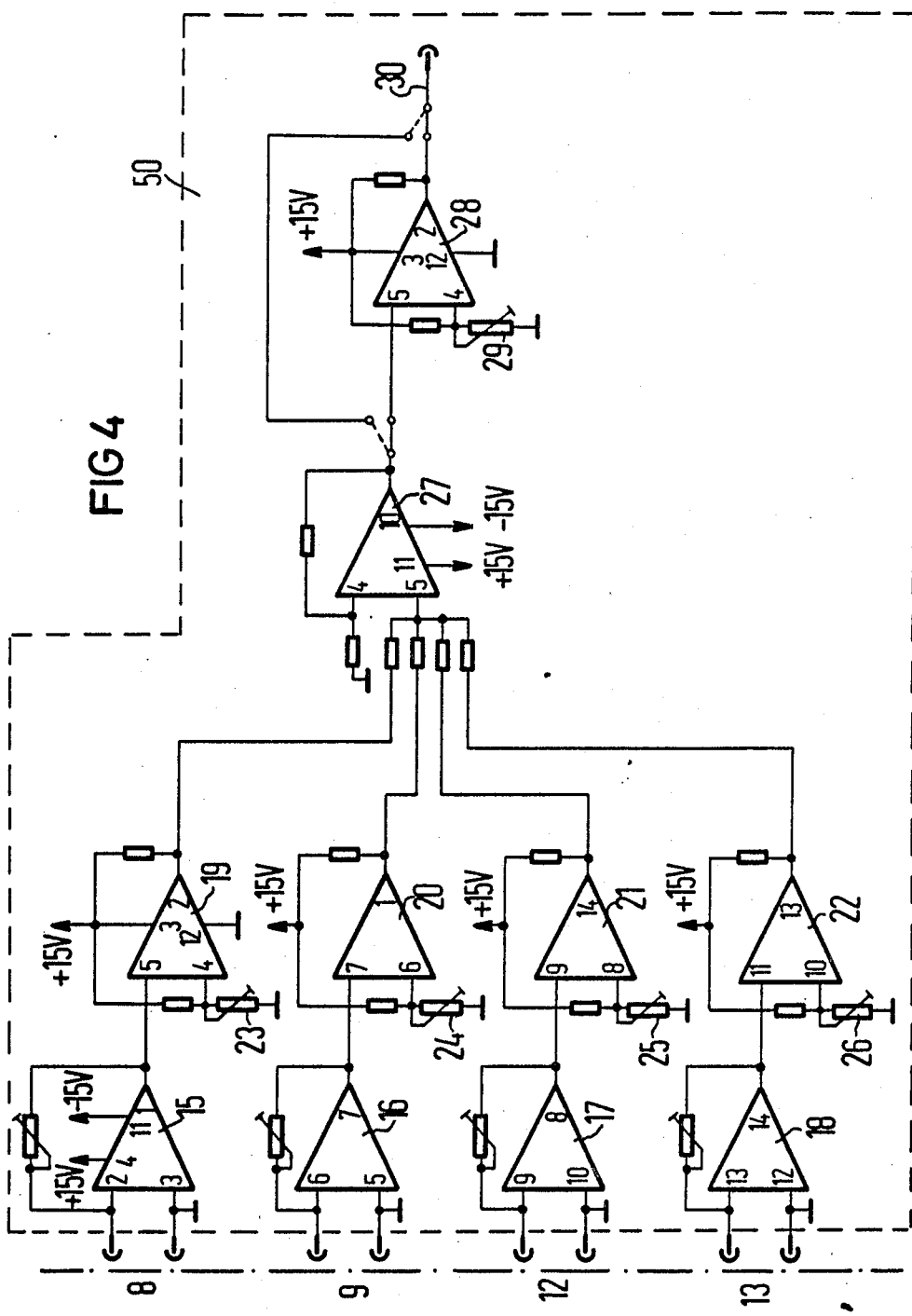

METHOD FOR ADJUSTING A REFERENCE SIGNAL FOR A LASER DEVICE OPERATING IN A GIANT PULSE MODE

BACKGROUND OF THE INVENTION

The present invention is directed to a method and device for adjusting a reference system of a pre-programmable beam deflection system of a process-controlled, computer-assisted laser device functioning in a giant pulse mode with respect to the position of the inscription field of a part to be processed particularly a silicon wafer. The method of adjusting utilizes a plurality of program search motions of a laser beam, which is scanning the part and is from a laser operating in a continuous wave mode, and senses light signals with photoelements to create position signals which are utilized to calculate the precise position of the part with respect to the reference system and corrects the coordinates of the reference system to match the precise position.

A method of adjusting a reference system of a preprogrammable beam deflection system of a process-controlled, computer-assisted laser device functioning in a giant pulse mode is disclosed in German LP No. 23 35 517. In this known system, the search motion of a laser beam, which is operating in a continuous wave mode or operation, scans the part and is programmed in such a manner that the reference marks disposed within the part to be processed can be found. In addition, photoelements or light detection elements are disposed above the work surface in such a manner that they can detect the reflected laser beam. Thus, one photoelement is allocated to each reference mark and each photoelement triggers a signal as soon as the reflected laser beam impinges upon it. A precondition for this, however, is that the part to be processed is positioned in such a manner that only a relatively slight correction motion is required for the system.

Laser devices, such as disclosed in U.S. Pat. No. 3,902,037, are also known for processing and labeling in which a measuring beam of a measuring laser is faded into the beam path of the giant pulse mode processing laser. This, however, presumes that the workpiece or part to be processed is precisely aligned regarding its processing location relative to the reference system of the processing laser. The alignment of the workpiece not only requires a considerable time but also presumes expensive devices such as an x-y work table.

To overcome these problems, German OS No. 26 24 121 proposes that the shape and size of a known workpiece surface is scanned by means of a laser measuring beam, the light of the laser measuring beam that is reflected from the surface of the workpiece is employed with the assistance of photodiodes for the identification of the position of the workpiece within the work field of the processing laser in such a manner that the potential coordinates of the workpiece surface can be identified relative to the center point coordinates of the work surface of the processing laser. With the assistance of a process control computer, the center point coordinates of the workpiece surface in the work field are calculated from these signals and subsequently the control program for the processing laser is transformed to the center coordinates of the workpiece surface.

SUMMARY OF THE INVENTION

The object of the present invention is to improve on the method and the device for adjusting a reference system of a pre-programmable beam deflection system of a processing device in such a manner that the method and device requires considerably less outlay than the known systems described hereinabove.

To obtain these objects, the present invention is directed to an improvement in the method for adjusting a reference system of a pre-programmable beam deflection system of a processing device having a processing laser operable in a giant pulse mode with respect to the position of an inscription field of a part to be processed, particularly of a silicon wafer, said method of adjusting including conducting a plurality of program search motions with a laser beam from a laser operating in a continuous wave mode, detecting light signals with photoelectric elements during each search motion and then calculating the precise position of the part with respect to the reference system from the detected light signals and correcting the coordinates of the reference system in response to the calculated position. The improvements comprise each of the search motions being directed to travel across an edge of said part, said step of detecting including positioning each of the photoelectric elements beneath the part adjacent the edge in the path of the search motion and detecting the light that is not blocked by the part to trigger a corresponding position signal as the laser beam passes across the edge of the part and said step of calculating including evaluating the position signals for correcting the coordinates of the reference system.

The device for adjusting the reference system includes an improvement in a device which includes means for conducting a plurality of program search motions of a laser beam from a laser operating in a continuous wave mode, photoelectric or light-sensitive elements positioned to detect light signals during each search motion, means for calculating the precise position of the part with respect to the reference system from the detected light signals and means for correcting the coordinates of the reference system in response to the precise position. The improvement comprises the means for conducting a plurality of program search motions having each search motion traverse an edge of the part being processed and each of the photoelectric elements being disposed below the part to receive the scanning light as the scanning beam passes over the edge of the part to trigger a corresponding position signal.

Because the photoelectric elements are disposed below the part to be processed and are directly driven, not only do clear electrical signals occur but rather a reduction of the cost of the structural and control-technical components also occurs. Furthermore, given corresponding dimensions and dispositions of the photoelectric elements, a matching of parts of different sizes is easily possible. Moreover, the parts to be processed need not be provided with extra markings or indicia. Therefore, the inventive method is particularly suited for processing silicon wafers which no marking characters whatsoever dare be provided. Given such silicon wafers, the inscription field is usually provided with a flattened or straight edge portion of the wafer. Thereby, it is expedient that the relative position of the straight edge portion relative to the reference system is detected with two mutually parallel scanning movements in the y-axis of the reference system of the programmed scanning motions and that subsequently the reference system is transformed in such a manner that the x-axis of the reference system extends parallel to the straight edge or flattened edge portion of the part and that the position of the center between the round edge of the silicon wafer adjacent the straight edge is identified with two oppositely directed scanning movements parallel to the new x-axis and that the entire reference system is them correspondingly corrected in view of the precise position that was determined.

Insofar as sufficiently large photoelectric elements are available, a single photoelectric element can be provided for one or more motions. When, however, the paths of the scanning motions lie very far apart, then it is expedient to provide a photoelectric element disposed below the silicon wafer for each proposed path of each scanning motion of the laser beam.

In order to be able to process silicon wafers with different wafer diameters, it is expedient that each of the photoelectric elements is preferably displaceably positioned in the x- and y-directions for the purpose of matching its position to the respective diameter of the silicon wafer.

Preferably the photoelectric elements or each of the photoelectric elements are disposed in or respectively below a recess of a supporting or work table of the processing device and is covered by an optical filter for the purpose of shielding the element from ambient light. In order to obtain a good illumination of each of the photoelectric elements, it is also desirable that a filter and a diffuser is positioned adjacent to the light-sensitive surface of the photoelectric element. Thus, the laser beam can be correspondingly attenuated and expanded prior to detection and the detecting surface of each of the photoelectric elements will be shielded from ambient light.

A separate current-voltage transformer and a threshold amplifier are expediently provided to receive the outputs of each of the photoelectric elements. The output of each of the individual threshold amplifiers is then connected to the input of a non-inverting amplifier, whose output is then preferably connected through an additional threshold amplifier for suppressing the undesired output signals of the first-mentioned threshold amplifiers.

BRIEF DESCRIPTION OF THE DRAWINGS

FIG. 1 is a diagrammatic illustration of a device for accomplishing the present invention;

FIG. 2 is an enlarged illustration showing the position of the photoelectric elements and illustrating the four program search motions for the detecting of precise positions of a part with different part orientations and sizes being illustrated in broken lines;

FIG. 3 is an enlarged cross-sectional view of a part of the device of FIG. 1 illustrating the execution of the method; and FIG. 4 is a circuit arrangement for the evaluation unit for the photoelectric elements.

DESCRIPTION OF THE PREFERRED EMBODIMENTS

The principles of the present invention are particularly useful in a device generally indicated at 100 and schematically illustrated in FIG. 1. The device 100 enables executing the inventive method on a flat surface of a silicon wafer or workpiece 6.

The device 100 includes a laser 1 creating a laser beam 40 which passes through a photoshutter 2 to project on a pivotable or rotating mirror 3, which creates a vertical deflection of the laser beam 40 and projects it at a second pivotable or rotating mirror 4 which causes a horizontal deflection of the beam. The beam 40 as deflected by the mirrors 3 and 4 is focused with the assistance of a lens 5 onto a part to be processed such as the silicon wafer 6 which is positioned or supported on a work table 7. In a manner known per se, the silicon wafer 6 has a flattened edge part forming a straight edge 61. As illustrated, the work table 7 has two large photoelectric elements 8 and 9 and the wafer 6 is positioned on the table 7 so that at least the ends of the straight edge 61 lie above the elements 8 and 9 and in addition the adjacent curved edges or round edges 62 also lie above each of the elements 8 and 9. A process-control computer 10, which is conventional, on the one hand, controls the intensity of the laser 1, the operation of the photoshutter 2 as well as the deflection of the laser beam 40 by revolving the mirrors 3 and 4. On the other hand, the computer 10 accepts the program of an input 11 as well as the signals of the photoelectric elements 8 and 9 which have been processed in an evaluation unit 50.

In order to be able to identify the position of the silicon wafer 6 on the table 7, the control computer 10 automatically controls the tilting of the two mirrors 3 and 4 so that the laser beam 40 from the laser 1 will move in four separate search motions a, b, c and d, as best illustrated in FIG. 2. Each of these four motions a-d is programmed in such a manner that their paths will pass over or traverse the edge of the silicon wafer 6 so that the associated photoelectric element disposed below the wafer will receive the laser beam as it passes across the edge of the wafer or part. By so doing, a precise position signal is communicated to the process control computer 10 which retains the coordinates of this transition point. The center coordinate of the silicon wafer 6 as well as the coordinates of the reference system can be placed in precise coincidence by means of scanning characteristic edge of the part 6.

As can be seen from FIG. 2 and in contrast to the execution according to FIG. 1, the embodiment of the device in FIG. 2 has two additional photoelectric elements 12 and 13, which are positioned below the silicon wafer 6 in addition to the above-mentioned two elements 8 and 9. As illustrated, the elements 8 and 9 are allocated to the paths a and b which cross the flattened or straight edge 61 while the photoelectric elements 12 and 13 are allocated or assigned to the paths c and d which cross the round edge portions 62 adjacent to the straight edge 61. The relative position of the straight edge 61 relative to the reference system can be identified with two programmed scanning motions a and b, which extend in the y-axis of the reference system of the program scanning motion. After this has been detected, the reference system is transformed in such a manner that the x-axis of the reference system will extend parallel to the straight edge 61. Subsequently, the position of the center between the edges 62 of the silicon wafer 6 adjacent to the straight edge 61 is identified with two program scanning motions c and d which are oppositely directed along the new x-axis which is shown by line 64. After determining the center, the reference system is then corrected again so that the precise position of the part 6 on table 7 has its center coinciding with the center of the reference system.

In FIG. 2, edge 61 is parallel to the original x-axis and thus the paths c and d travel parallel to both the old and new x-axis. However, edge 61 can be tilted to the x-axis as illustrated by line 65 and then the paths c and d would be on a line 66 which is parallel to line 65 and the new x-axis. If the edge 61 were tilted in the opposite direction as shown by line 68, the paths c and d would be on line 69 which would be parallel to the new x-axis and line 68.

As best illustrated in FIG. 3, each of the photoelectric elements such as the element 8 is disposed beneath the workpiece 6 as it rests on the table 7. As illustrated, the element is actually positioned below the table 7 which has a window or recess 71. The edge of the workpiece 6 will lie above the recess 71 so that the laser beam 40 will strike the detecting surface of the photoelectric element 8 when the beam 40 passes over the edge of the workpiece as illustrated by the broken lines 40'. In order to keep extraneous light away from the light-sensitive surface or element 8, the recess 71 is provided with an optical filter 710 below which a diffuser 14 is situated. The diffuser 14 not only attenuates the laser beam 40 while in the continuous wave operation but also causes it to diverge as indicated by the broken line portion 40". Thus, one safely avoids having the photoelement being damaged by the laser beam 40 which is focused on the surface of the silicon wafer 6. Moreover, a better illumination of the detecting surface of the element 8 will occur. For the purpose of compensating for the positional deviations, the laser need merely be switched from a giant pulse mode operation to a continuous wave mode or operation without the focusing needing to be altered.

As can be seen from FIG. 2, the wafer 6 can have different sizes, for example, diameter of 3", 4", 5" or 6" and it can be detected by utilizing the four photoelectric elements 8, 9, 12 and 13 which are in the position as illustrated. Relatively small photoelectric elements can be utilized if each of the elements can be adjusted in the x- and y-directions. Filters, which are known per se, can be employed as the diffusers and the thickness is selected in such a manner that a desired divergence of the laser beam 40 is produced. Insofar as a feed with the corresponding tolerance is provided, it is possible that an involved work table, which is adjusted in the x- and y-directions, can be eliminated in view of the present invention.

A circuit diagram for the evaluation unit 50 that evaluates the detectiong signals coming from each of the elements 8, 9, 12 and 13 is illustrated in FIG. 4. Each of the photoelements 8, 9, 12 and 13 is connected to an individual current voltage converter 15-18, respectively, which are known devices and convert the current output from the respective photoelectric element into a voltage. The voltage from each of these converters 15-18 is applied as an input signal to an individual threshold amplifier 19-22. The threshold can be adjusted for each of these threshold amplifiers 19-22 by adjusting of the respective potentiometers 23-26 in such a manner that the destructive influences of extraneous light and the like can be suppressed. As mentioned hereinabove, the four converters 15-18 as well as the four amplifiers 19-22 can be conventional units and, for example, the amplifiers may be a quad-amplifier package of a type well known to a person of ordinary skill in the art with the exemplary pin connections being shown in FIG. 4.

The output of each of the threshold amplifiers 19-22 are connected to a non-inverting input of a summing amplifier 27 whose output is then connected to an additional threshold amplifier 28. This additional threshold amplifier 28 can have its threshold set by a potentiometer 29 to suppress any undesirable output signals. The output of the threshold amplifier 28 has an output 30 which can be directly connected to the input of the process computer 10 of FIG. 1.

The process control computer 10 as well as the program of the input 11 are well known in the particular art.

Although various minor modifications may be suggested by those versed in the art, it should be understood that we wish to embody within the scope of the patent granted hereon, all such modifications as reasonably and properly come within the scope of our contribution to the art.

We claim:

1. In a method for adjusting a reference system of a pre-programmable beam deflection system of a processing device having a processing laser operable in a giant pulse mode with respect to a position of the inscription field of a part to be processed, particularly a silicon wafer, said method of adjusting including conducting a plurality of programmed search motions with a laser beam from a laser operating in a continuous wave mode, detecting light signals with photoelectric elements during each search motion, and then calculating precise positions of the part with respect to the reference system from the detected light signals and correcting the coordinates of the reference system in response to the calculated positions, the improvements comprising each of the search motions being directed to travel in a path across an edge of said part, said step of detecting including positioning each of the photoelectric elements beneath the part adjacent the edge in the path of the search motion and detecting the light that is not blocked by the part to trigger a corresponding position signal as the laser beam passes across the edge of the part and said step of calculating includes evaluating the position signals for correcting the coordinate of the reference system.

2. In a method according to claim 1, wherein the part being processed has at least one straight edge, said step of conducting a plurality of programmed search motion conducts four scanning motions with the first two scanning motions being parallel to each other along a y-axis of the reference system and across one straight edge of the part, said step of calculating the precise position includes shifting a x-axis of the reference system to extend parallel to the straight edge, and then conducting the third and fourth scanning motions parallel to the newly positioned x-axis and said straight edge to determine the center of said straight edge and subsequently correcting the reference system accordingly.

3. In a device for adjusting the reference system of a pre-progammable beam deflection system of a laser processing device with respect to the position of an inscription field of a part to be processed, said device for adjusting including means for conducting a plurality of programmed search motions of a laser beam from a laser operating in a continuous wave mode, photoelectric elements positioned to detect light signals during each search motion, means for calculating the precise position of the part with respect to the reference system from the detected light signals and means for correcting the coordinates of the reference system in response to the precise position, the improvements comprising the means for conducting a plurality of program search motions having each search motion traveling in a path that traverses an edge of the part being processed and each of the photoelectric elements being disposed below the part and in a path to receive the scanning light as the scanning motion passes over the edge of the part to trigger a corresponding position signal.

4. In a device according to claim 1, wherein four photoelectric elements are positioned under the part with two elements for sensing paths moving in a y-direction of the reference system, which has a x-direction at right angles to the y-direction, and two for sensing paths moving in the x-direction.

5. In a device according to claim 3, wherein the part being machined is received on a work table of the processing device, said work table having a recess for receiving each of the photoelectric elements, each recess containing an optical filter for shielding the photoelement from ambient light.

6. In a device according to claim 3, wherein each of the photoelectric elements has arranged therewith a filter for shielding the element from ambient light and diffuser means for diverging the laser beam of the continuous wave mode prior to striking the element.

7. In a device according to claim 3, wherein the means for calculating includes each of the photoelectric elements having a current voltage converter for receiving the output of the element and a threshold amplifier receiving the output from the converter.

8. In a device according to claim 7, wherein the means for calculating includes a non-inverting amplifier receiving the output of each of the individual threshold amplifiers, said non-inverting amplifier having its output received by an additional threshold amplifier for suppressing undesirable output signals from the first-mentioned threshold amplifiers.

* * * * *